United States Patent
Zhang et al.

(10) Patent No.: US 12,181,343 B2
(45) Date of Patent: Dec. 31, 2024

(54) METHOD AND SYSTEM FOR BUILDING SHORT-WAVE, MEDIUM-WAVE AND LONG-WAVE INFRARED SPECTRUM DICTIONARY

(71) Applicant: Huazhong University of Science and Technology, Hubei (CN)

(72) Inventors: Tianxu Zhang, Hubei (CN); Wandong He, Hubei (CN); Lei Gao, Hubei (CN); Bin Zhou, Hubei (CN); Xin Zhou, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/298,250

(22) Filed: Apr. 10, 2023

(65) Prior Publication Data

US 2024/0044715 A1    Feb. 8, 2024

(30) Foreign Application Priority Data

Aug. 5, 2022 (CN) .......................... 202210939010.6

(51) Int. Cl.
*G01J 5/10* (2006.01)
*G01N 21/63* (2006.01)
(Continued)

(52) U.S. Cl.
CPC .......... *G01J 5/10* (2013.01); *G01J 2005/0077* (2013.01); *G01N 21/27* (2013.01); *G01N 21/63* (2013.01)

(58) Field of Classification Search
CPC .......... G01J 5/00; G01J 5/10; G01J 2005/0077
(Continued)

(56) References Cited

U.S. PATENT DOCUMENTS 3,689,924 A * 9/1972 Caruso, Jr. .............. G01S 3/146
                                                    342/423
4,463,360 A * 7/1984 Kikuchi ............... B41J 13/0054
                                                    347/215
(Continued)

FOREIGN PATENT DOCUMENTS

CN         101577033 A  *  11/2009
CN         101976275 A  *   2/2011
(Continued)

OTHER PUBLICATIONS

U.S. Appl. No. 18/298,250, filed Nov. 9, 2023_CN_106483522_A_H.pdf,Mar. 2017.*
(Continued)

*Primary Examiner* — Gail Kaplan Verbitsky
(74) *Attorney, Agent, or Firm* — HSML P.C.

(57) ABSTRACT

A method and a system for building a short-wave, medium-wave and long-wave infrared spectrum dictionary are provided. The method includes: building an infrared three-primary-color chromaticity diagram by using infrared spectrum response curves of an infrared three-primary-color sensor group; performing weighted combination on the infrared spectrum response curves; performing multi-scale discretization on the infrared three-primary-color chromaticity diagram, clustering chromaticity coordinates generated by discretization into different groups, performing weighted combination on the infrared spectrum response curves corresponding to the chromaticity coordinates of each point in the groups, generating a new image-space infrared spectrum, and adding the new image-space infrared spectrum to an initial image-space infrared spectrum dictionary; performing weighted combination on object-space Planck curves associated with three different temperatures to build an object-space Planck spectrum dictionary; and using the final image-space infrared spectrum dictionary and the
(Continued)

object-space Planck spectrum dictionary to build the short-wave, medium-wave and long-wave infrared spectrum dictionary.

20 Claims, 6 Drawing Sheets

(51) Int. Cl.
 *G01J 5/00* (2022.01)
 *G01N 21/27* (2006.01)

(58) Field of Classification Search
 USPC .................................. 374/121, 1, 2
 See application file for complete search history.

(56) References Cited

U.S. PATENT DOCUMENTS

| | | | | |
|---|---|---|---|---|
| 7,385,705 | B1* | 6/2008 | Hoctor | G02B 26/06 |
| | | | | 356/456 |
| 9,554,738 | B1* | 1/2017 | Gulati | A61B 5/0075 |
| 10,656,012 | B2* | 5/2020 | Atabaki | G01J 3/2803 |
| 11,733,094 | B2* | 8/2023 | Redmond | G01J 3/26 |
| | | | | 356/326 |
| 2002/0101587 | A1* | 8/2002 | Wilson | G01J 3/0208 |
| | | | | 359/570 |
| 2003/0142307 | A1* | 7/2003 | Hutchin | G01J 3/12 |
| | | | | 356/326 |
| 2011/0211763 | A1* | 9/2011 | Maier | G01N 21/65 |
| | | | | 382/218 |
| 2018/0309941 | A1* | 10/2018 | Lopez | H04N 23/95 |

FOREIGN PATENT DOCUMENTS

| | | | | | |
|---|---|---|---|---|---|
| CN | 106483522 | A | * | 3/2017 | ................ G01J 5/00 |
| CN | 108168699 | A | * | 6/2018 | |
| CN | 108287350 | A | * | 7/2018 | ........... G01S 17/933 |
| CN | 110008989 | A | * | 7/2019 | |
| CN | 111562006 | A | * | 8/2020 | |
| CN | 114459604 | A | * | 5/2022 | ............ G01J 3/2823 |
| CN | 114993470 | A | * | 9/2022 | |
| GB | 2062218 | A | * | 5/1981 | ................ G01J 5/60 |
| GB | 2322985 | A | * | 9/1998 | ............... G01S 11/12 |
| JP | H06235598 | A | | 8/1994 | |
| WO | WO-2018142295 | A1 | * | 8/2018 | ............ G01J 3/0208 |
| WO | WO-2021118806 | A1 | * | 6/2021 | ........... A61B 5/0075 |

OTHER PUBLICATIONS

U.S. Appl. No. 18/298,250, filed Nov. 9, 2023_CN_114459604_A_H.pdf,May 2022.*
U.S. Appl. No. 18/298,250, filed Nov. 9, 2023_GB_2322985_A_H.pdf, Sep. 1998.*
U.S. Appl. No. 18/298,250, filed Nov. 8, 2023_CN_110008989_A_H.pdf,Jul. 2019.*
U.S. Appl. No. 18/298,250, filed Nov. 9, 2023_CN_101976275_A_H.pdf,Feb. 2011.*
U.S. Appl. No. 18/298,250, filed Nov. 8, 2023_CN_108168699_A_H.pdf,Jun. 2018.*
U.S. Appl. No. 18/298,250, filed Nov. 8, 2023_CN_108287350_A_H.pdf,Jul. 2018.*
U.S. Appl. No. 18/298,250, filed Nov. 13, 2023_GB_2062218_A_H.pdf,May 1981.*
U.S. Appl. No. 18/298,250, filed Mar. 27, 2024_GB_2062218_A_H.pdf,May 20, 1981.*
U.S. Appl. No. 18/298,250, filed Mar. 27, 2024_JP_H06235598_A_H.pdf,IAug. 23, 1994.*
U.S. Appl. No. 18/298,250, filed Sep. 4, 2024_WO_2018142295_A1_H.pdf,Aug. 9, 2018.*
U.S. Appl. No. 18/298,250, filed Sep. 4, 2024_WO_2021118806_A1_H.pdf,Jun. 17, 2021.*
U.S. Appl. No. 18/298,250, filed Sep. 5, 2024_WO_2018142295_A1_H.pdf,Aug. 9, 2018.*

* cited by examiner

METHOD AND SYSTEM FOR BUILDING SHORT-WAVE, MEDIUM-WAVE AND LONG-WAVE INFRARED SPECTRUM DICTIONARY

TECHNICAL FIELD

The present invention belongs to the crossing field of infrared physics and photoelectric detection, and in particular, relates to a method and system for building a short-wave, medium-wave and long-wave infrared spectrum dictionary.

BACKGROUND ART

Timely acquiring complete and accurate temporal-spatial-spectral multi-dimensional measurement data and information of moving targets and dynamic phenomena in complex scenarios is nowadays an urgent, major and fundamental topic for facilitating scientific research, accelerating social development, upgrading technologies for industry and national security.

The measurement and acquisition of information from moving targets and dynamic phenomena are very difficult tasks. This is because the information is evanescent, has time validity, and contains a large amount of data. It is very difficult for an existing conventional measuring instrument to complete the tasks under complex and changeable scenarios and environmental conditions to obtain mass data of the moving objects and dynamic phenomena.

The target has a low signal-to-clutter ratio, a low signal-to-noise ratio and no geometric texture with respect to various background interferences. Mining of a spectral invariant feature for distinguishing the target from the interference in the all-band spectrum dimension is required for greatly improving the detection and identification capability of photoelectric detection in the face of complex environments.

The spectral information of a moving target contains deep essential information thereof, and a timely and accurate measurement is very important. However, due to the structural limitation, the finer the beam is to be split, the closer the detection distance is required for a conventional spectroscopic imaging spectrometer. The Fourier interference imaging spectrometer is superior to the former in the detection distance due to a large luminous flux, but the structure thereof is complex, the computation load is heavy, and it is difficult to obtain the spectral cube in real time. Therefore, imaging spectrometers having the above two structures are not suitable for real-time spectrum acquisition of distant moving targets and dynamic phenomena. The above imaging spectrometers are limited to the conventional concept and approach for spectrometry imaging, and do not organically combine the radiation/scattering/colorimetry theory/sensor spectral characteristics/target background characteristics and target identification/computational informatics and the like to create a new spectrometry imaging framework.

The spectral video imaging or snapshot, which is popular internationally at present and requires technologies such as aperture coding etc., has a narrow spectral band, is in the visible light wave band, and is therefore not suitable for broadband detection of a moving target.

SUMMARY OF THE INVENTION

For the defects in the prior art, an objective of the present invention is to provide a method and system for building a short-wave, medium-wave and long-wave infrared spectrum dictionary, aiming at solving the problem that existing spectrometers are not suitable for real-time acquisition of spectra of distant moving targets and dynamic phenomena.

To achieve the above objective, in one aspect, the present invention provides a method for building a short-wave, medium-wave and long-wave infrared spectrum dictionary, comprising the following steps:

S1: measuring to obtain infrared spectrum response curves of an infrared three-primary-color sensor group under a condition of variable input signals, wherein the infrared three-primary-color sensor group comprises: a short-wave infrared sensor, a medium-wave infrared sensor and a long-wave infrared sensor;

S2: performing normalization on the infrared spectrum response curves of the infrared three-primary-color sensor group, using same as spectrum-based functions, and taking the proportions of the sum of tristimulus values accounted for by the tristimulus values corresponding to an infrared imaging sensor group as chromaticity of an infrared band to form an infrared three-primary-color chromaticity diagram;

S3: performing weighted combination on the infrared spectrum response curves to build an initial image-space infrared spectrum dictionary;

S4: performing multi-scale discretization on the infrared three-primary-color chromaticity diagram, clustering chromaticity coordinates generated by discretization into different groups, performing weighted combination on the infrared spectrum response curves corresponding to the chromaticity coordinates of each point in the groups, generating a new image-space infrared spectrum, adding the new image-space infrared spectrum in the initial image-space infrared spectrum dictionary, and generating a final image-space infrared spectrum dictionary;

S5: performing weighted combination on object-space Planck curves associated with three different temperatures to build an object-space Planck spectrum dictionary, wherein the object-space Planck curves associated with three different temperatures are respectively a high-temperature object-space Planck curve, a medium-temperature object-space Planck curve and a low-temperature Planck curve according to the temperatures; and S6: using the final image-space infrared spectrum dictionary and the object-space Planck spectrum dictionary to build a short-wave, medium-wave and long-wave infrared spectrum dictionary.

Further preferably, the method further comprises the following steps between S5 and S6:

selecting a preset real target and a preset background, and acquiring an image-space infrared spectrum of the real target and the background by using the infrared three-primary-color sensor group; and adding the image-space infrared spectrum of the real target and the background to the final image-space infrared spectrum dictionary.

Further preferably, S4 specifically comprises the following steps:

taking points on the infrared three-primary-color chromaticity diagram with different spectral resolutions, and performing discretization on the infrared three-primary-color chromaticity diagram to build a multi-scale spectrum curve of the infrared three-primary-color sensor group, wherein the scales indicate changes in the spectral resolutions;

clustering chromaticity coordinates generated by discretization according to different spectral resolutions into different groups;

for a single point on the infrared three-primary-color chromaticity diagram, performing weighted superposition according to three coordinate values of medium-wave infrared, long-wave infrared and short-wave infrared to calculate an image-space infrared spectrum curve corresponding to the single point on the infrared three-primary-color chromaticity diagram;

for a set of aggregated adjacent points on the infrared three-primary-color chromaticity diagram, respectively adding three coordinate values of medium-wave infrared, long-wave infrared and short-wave infrared corresponding to each of the points, performing division by the number of coordinate points, using same as weighting coefficients to perform weighted addition on infrared spectrum response curves corresponding to each wave band, and building a new image-space infrared spectrum curve;

for spectrum response curves corresponding to a line segment on the infrared three-primary-color chromaticity diagram, respectively adding three coordinate values of medium-wave infrared, long-wave infrared and short-wave infrared corresponding to each of points on the line segment, performing division by the number of points on the line segment, respectively taking the calculation results of the three coordinate values as weighting coefficients of infrared spectrum response curves of the corresponding wave band for superposition calculation, and building a new image-space infrared spectrum curve;

for spectrum response curves corresponding to a curve on the infrared three-primary-color chromaticity diagram, respectively adding three coordinate values of medium-wave infrared, long-wave infrared and short-wave infrared corresponding to each of points according to position relations of the points on the curve, performing division by the number of points on line segments, respectively taking calculation results of the three coordinate values as weighting coefficients of infrared spectrum response curves of the corresponding wave band for superposition calculation, and building a new image-space infrared spectrum curve; and adding all of the new image-space infrared spectrum curves to the initial image-space infrared spectrum dictionary to generate a final image-space infrared spectrum dictionary.

Further preferably, elements of the object-space Planck spectrum dictionary are represented as follows:

$$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

where $\text{Planck\_curve}_H$ represents a high-temperature Planck curve element; $\text{Planck\_curve}_M$ represents a medium-temperature Planck curve element; $\text{Planck\_curve}_L$ represents a low-temperature Planck curve element; $\alpha$ represents area coefficients multiplied by object-space Planck curves associated with three temperatures, so that the high-temperature object-space Planck spectrum curve, the medium-temperature object-space Planck spectrum curve and the low-temperature object-space Planck spectrum curve have the same order of magnitude; $c_1$ represents a first radiation constant; $c_2$ represents a second radiation constant; and $\lambda$ is the wavelength of the object-space Planck spectrum, and T is an absolute temperature in units of K.

Further preferably, the coordinates of the infrared three-primary-color chromaticity diagram are:

swir=SWIR/(SWIR+MWIR+LWIR);

mwir=MWIR/(SWIR+MWIR+LWIR); and lwir=LWIR/(SWIR+MWIR+LWIR), where swir+mwir+lwir=1, and SWIR, MWIR, and LWIR are respectively stimulus values corresponding to short-wave infrared, medium-wave infrared and long-wave infrared.

In another aspect, the present invention provides a system for building a short-wave, medium-wave and long-wave infrared spectrum dictionary, comprising:

an infrared three-primary-color sensor group, configured to measure to obtain infrared spectrum response curves under a condition of variable input signals, wherein the infrared three-primary-color sensor group comprises: a short-wave infrared sensor, a medium-wave infrared sensor and a long-wave infrared sensor;

a module for building an infrared three-primary-color chromaticity diagram, configured to perform normalization on the infrared spectrum response curves of the infrared three-primary-color sensor group, use same as spectrum-based functions, and take the respective proportions of the sum of tristimulus values accounted for by the tristimulus values corresponding to an infrared imaging sensor group as chromaticity in an infrared band to form an infrared three-primary-color chromaticity diagram;

a module for building an initial image-space infrared dictionary, configured to perform weighted combination on the infrared spectrum response curves to build an initial image-space infrared spectrum dictionary;

a module for building a final image-space infrared dictionary, configured to perform multi-scale discretization on the infrared three-primary-color chromaticity diagram, cluster chromaticity coordinates generated by discretization into different groups, perform weighted combination on infrared spectrum response curves corresponding to the chromaticity coordinates of each point in the groups, generate a new image-space infrared spectrum, add the new image-space infrared spectrum to the initial image-space infrared spectrum dictionary, and generate a final image-space infrared spectrum dictionary;

a module for building an object-space Planck spectrum dictionary, configured to perform weighted combination on object-space Planck curves associated with three different temperatures to build an object-space Planck spectrum dictionary, wherein the object-space Planck curves associated with three different temperatures are respectively a high-temperature object-space Planck curve, a medium-temperature object-space Planck curve and a low-temperature object-space Planck curve according to the temperatures; and a module for building a short-wave, medium-wave and long-wave infrared spectrum dictionary, configured to build a short-wave, medium-wave and long-wave infrared spectrum dictionary by using the final image-space infrared spectrum dictionary and the object-space Planck spectrum dictionary.

Further preferably, the infrared three-primary-color sensor group is further configured to select a preset real target and a preset background and acquire an image-space infrared spectrum of the real target and the background, and
a spectrum processing module is configured to add the image-space infrared spectrum of the real target and the background to the final image-space infrared spectrum dictionary.

Further preferably, the module for building a final image-space infrared dictionary comprises:
a chromaticity diagram discretization unit, configured to take points on the infrared three-primary-color chromaticity diagram with different spectral resolutions, perform discretization on the infrared three-primary-color chromaticity diagram, and build a multi-scale spectrum curve of the infrared three-primary-color sensor group, wherein the scales indicate changes in the spectral resolutions;
a coordinate clustering unit, configured to cluster chromaticity coordinates generated by discretization according to different spectral resolutions into different groups;
a unit for building a single-point image-space infrared spectrum curve, configured to perform weighted superposition according to three coordinate values of medium-wave infrared, long-wave infrared and short-wave infrared for a single point on the infrared three-primary-color chromaticity diagram, and calculate an image-space infrared spectrum curve corresponding to the single point on the infrared three-primary-color chromaticity diagram;
a unit for building a point-set image-space infrared spectrum curve, configured to respectively add three coordinate values of medium-wave infrared, long-wave infrared and short-wave infrared corresponding to each of points for a set of aggregated adjacent points on the infrared three-primary-color chromaticity diagram, perform division by the number of coordinate points, use same as weighting coefficients to perform weighted addition on infrared spectrum response curves corresponding to each wave band, and build a new image-space infrared spectrum curve;
a unit for building a line-segment image-space infrared spectrum curve, configured to: for a line segment on the infrared three-primary-color chromaticity diagram, respectively add three coordinate values of medium-wave infrared, long-wave infrared and short-wave infrared corresponding to each of points on the line segment, perform division by the number of points on the line segment, respectively take calculation results of the three coordinate values as weighting coefficients of infrared spectrum response curves of the corresponding wave band for superposition calculation, and build a new image-space infrared spectrum curve;
a unit for building a curve image-space infrared spectrum curve, configured to: for a curve on the infrared three-primary-color chromaticity diagram, respectively add three coordinate values of medium-wave infrared, long-wave infrared and short-wave infrared corresponding to each of points according to position relations of the points on the curve, perform division by the number of points on line segments, respectively take calculation results of the three coordinate values as weighting coefficients of infrared spectrum response curves of the corresponding wave band for superposition calculation, and build a new image square infrared spectrum curve; and
a unit for building a final image-space infrared spectrum dictionary, configured to add all of the new image-space infrared spectrum curves to the initial image-space infrared spectrum dictionary to generate a final image-space infrared spectrum dictionary.

Further preferably, elements of the object-space Planck spectrum dictionary are represented as follows:

$$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

where Planck_curve$_H$ represents a high-temperature Planck curve element; Planck_curve$_M$ represents a medium-temperature Planck curve element; Planck_curve$_L$ represents a low-temperature Planck curve element; $\alpha_h$, $\alpha_m$ and $\alpha_L$ represents area coefficients multiplied by the high-temperature object-space Planck spectrum curve, the medium-temperature object-space Planck spectrum curve and the low-temperature object-space Planck spectrum curve; $c_1$ represents a first radiation constant; $c_2$ represents a second radiation constant; and $\lambda$ is the wavelength of the object-space Planck spectrum, and T is an absolute temperature in units of K.

Further preferably, the coordinates of the infrared three-primary-color chromaticity diagram are:

swir=SWIR/(SWIR+MWIR+LWIR);

mwir=MWIR/(SWIR+MWIR+LWIR); and lwir=LWIR/(SWIR+MWIR+LWIR), where swir+mwir+lwir=1, and SWIR, MWIR, and LWIR are respectively stimulus values corresponding to short-wave infrared, medium-wave infrared and long-wave infrared.

In general, compared with the prior art, the above technical solutions conceived by the present invention have the following beneficial effects:
according to the method and system for building a short-wave, medium-wave and long-wave infrared spectrum dictionary provided by the present invention, on the one hand, infrared spectrum response curves of an infrared three-primary-color sensor group are normalized to serve as spectrum-based functions, and an infrared three-primary-color chromaticity diagram is built through three infrared tristimulus values. The image-space infrared spectrum dictionary is built in two steps: 1. performing weighted combination on the infrared spectrum response curves to build an initial image-space infrared spectrum dictionary; and 2. performing multi-scale discretization on the infrared three-primary-color chromaticity diagram, clustering the chromaticity coordinates generated by discretization into different groups and points, performing weighted combination on the infrared spectrum response curves corresponding to the chromaticity coordinates of the groups and points, generating a new image-space infrared spectrum, adding the new image-space infrared spectrum to the initial image-space infrared spectrum dictionary, to generating a final image-space infrared spectrum dictionary. The image-space infrared spectrum dictionary completed in two steps comprises a large amount of various infrared spectra. On the other hand, according to the present invention, object-space Planck curves associated with three different temperatures are subjected to weighted combination to build an object-space Planck spectrum dictionary. The short-wave, medium-wave and long-wave infrared spectrum dictionary is built by using the image-space infrared spectrum dictionary and the object-space Planck spectrum dictionary, thereby supporting preparation of a novel computational imaging spectrometer.

The method for building the short-wave, medium-wave and long-wave infrared spectrum dictionary provided by the present invention employs the concept different from the current concept in the computational imaging spectrometry field. The method performs normalization on infrared spectrum response curves obtained by short-wave, medium-wave and long-wave infrared three-primary-color sensors to form an infrared three-primary-color chromaticity diagram so as to build an image infrared spectrum dictionary, fully considers spectrum sensing characteristics of the sensor body, has better adaptability to the scenario requiring real-time computational spectrometry imaging, is applicable to the real-time acquisition of spectra of remote moving targets and dynamic phenomena, and has better popularization significance for general computational spectrometry imaging.

DETAILED DESCRIPTION

Figure 1:
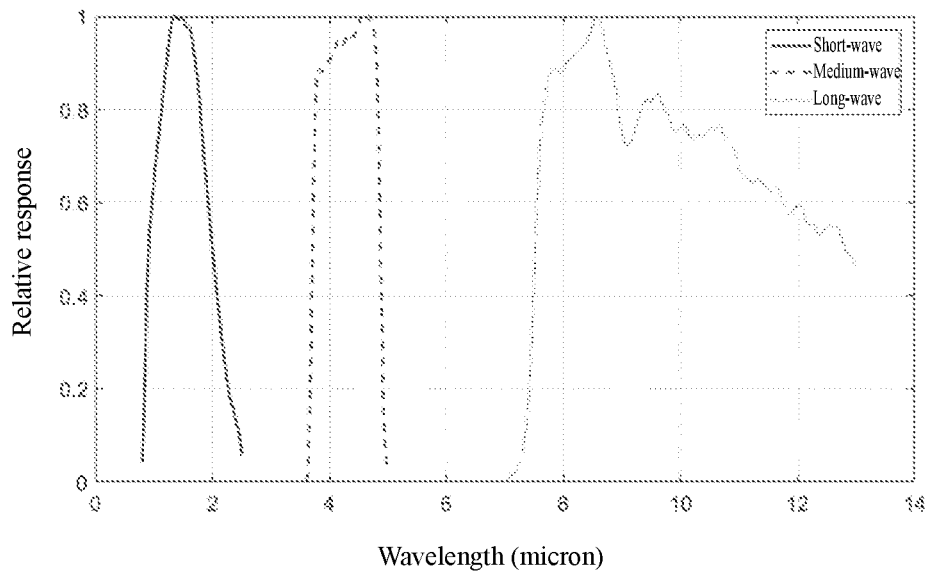
FIG. 1 shows three infrared detectors according to an embodiment of the present invention, respectively having a typical short wave center wavelength of 2.5 microns, a medium-wave infrared center wavelength of 4 microns and a long-wave infrared center wavelength of 8 microns, and having overlapping spectrum response curves at the junctions.

To make the purpose, technical solution, and advantages of the present invention clearer, the present invention is further described in detail below in connection with the accompanying drawings and embodiments. It should be appreciated that the specific embodiments described here are used merely to explain the present invention and are not used to define the present invention.

The general idea of the present invention is as follows: spectral data of infrared broad bands is rebuilt by using sort-wave, medium-wave and long-wave infrared three primary colors and an infrared chromaticity diagram, and an image-space infrared spectrum dictionary is established by mining the inherent spectral characteristics of infrared sensors, the relevance of multi-band spectra of different infrared sensors and the inherent spectral characteristics of a target background; Planck curves of a typical black body at high temperature (1000K), medium temperature (600K) and normal temperature (300K) are obtained from calculation and are subjected to weighted combination to build an infrared sensor conversion function, target radiation is reversely deduced from a sensor response, and an inverted object-space Planck spectrum dictionary is built; the image-space infrared spectrum dictionary and the object-space Planck spectrum dictionary jointly form a short-wave, medium-wave and long-wave infrared spectrum dictionary, which is organized according to multiple precision scales (from coarse to precise), such that query and calculation can be performed at different precision levels, and calculation is performed with respect to multiband infrared images captured by the infrared three-primary-color sensor group to obtain a target image-space infrared spectrum; and the structure of the short-wave, medium-wave and long-wave infrared spectrum dictionary is the basis and the support for computational imaging spectrometry.

Definitions involved in the present invention are as follows:

1. An Image-Space Infrared Spectrum Dictionary Built by Short-Wave, Medium-Wave and Long-Wave Infrared Three Primary Colors A spectrum type set formed by linear and nonlinear combinations of short-wave, medium-wave and long-wave infrared spectra in the infrared sensor is defined as an image-space infrared spectrum acquired by the infrared sensor; organization is performed according to multiple scales (from coarse to precise), such that query and calculation can be performed at different precision levels; the visible light three-color spectrometry imaging principle is popularized to a short-wave, medium-wave and long-wave infrared broad spectrum three-color generation model; the source of the infrared broad spectrum generation is mainly related to self-radiation of the target and the background in addition to reflection of solar radiation; the spectrum response function of a three-sensing-element array comprising a short-wave infrared imager, a medium-wave infrared imager and a long-wave infrared sensor is a known spectral distribution which can be calibrated and measured; and spectra having infrared broad-spectrum characteristics of various reasonable targets and backgrounds can be generated by performing weighting and advanced processing using the spectrum response characteristics of the three-sensing-element array.

2. An Object-Space Planck Spectrum Dictionary, Wherein the Object-Space Planck Spectrum Dictionary May be Obtained by Inverting an Image-Space Infrared Spectrum Dictionary:

a spectrum type set formed by linear and nonlinear combinations of high-temperature (1000K), medium-temperature (600K) and normal-temperature (300K) typical black body Planck curves is defined as an object-space Planck spectrum of the target;

for decomposition of spectral features of a non-homogenous and non-homothermal target, the radiation spectrum $S_I$ of the target is the weighted sum of radiation spectra of n constituent parts $\{S_i\}$ of the target, that is:

$$S_I = \alpha_1 S_1 + \alpha_2 S_2 + \ldots + \alpha_i S_i + \ldots + \alpha_n S_n$$

where $\alpha_i$ is the area ratio (volume) of the $i^{th}$ constituent part, and $S_i$ is the radiation spectrum of the $i^{th}$ constituent part;

the radiation spectrum emissivity of the $i^{th}$ constituent part in the target is $\varepsilon_i$, the temperature is $T_i$, and the corresponding black body spectrum radiation (object-space Planck spectrum) is $M_i$, then:

$$S_I = \alpha_1 \varepsilon_1 M_1 + \alpha_2 \varepsilon_2 M_2 + \ldots + \alpha_i \varepsilon_i M_i + \ldots + \alpha_n \varepsilon_n M_n$$

that is, it is necessary to calculate the black body radiation weighted sum corresponding to n constituent parts of the target with different temperatures and different emissivities so as to calculate the radiation spectrum of the target; $S_I$ may be decomposed into n black body radiations to obtain n weighting coefficients $\alpha_i$ and n emissivities $\varepsilon_i$;

therefore, the all-band spectrum response function of the infrared sensor, and the Planck curves of the black body at high temperature, medium temperature and normal temperature are also obtained from weighted arrangement and combination;

the image-space infrared spectrum of the target represents an infrared radiation spectrum acquired by the infrared sensor; the inverted three-color Planck curve of the infrared sensor is an object-space Planck spectrum and represents infrared radiation of the target; and the object-space Planck spectrum is subjected to atmospheric transmission and then is acquired by an infrared camera and converted into an image-space infrared spectrum, where the attenuation of the object-space Planck spectrum due to the absorption by the atmosphere and the enhancement of the object-space Planck spectrum by the radiation of the atmosphere are included, components of the non-homogenous and non-homothermal target have different spectral reflectivities, and the corresponding object-space Planck spectrum dictionary can be obtained by performing reverse deduction and inversion on the image-space infrared spectrum dictionary.

Figure 2:
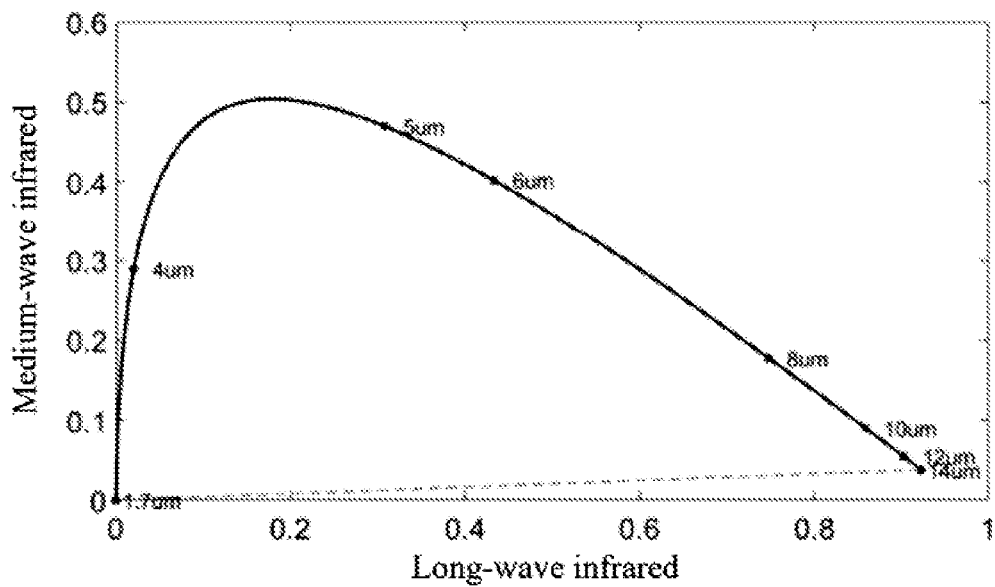
FIG. 2 is an infrared band three-primary-color chromaticity diagram according to an embodiment of the present invention.
Figure 3:
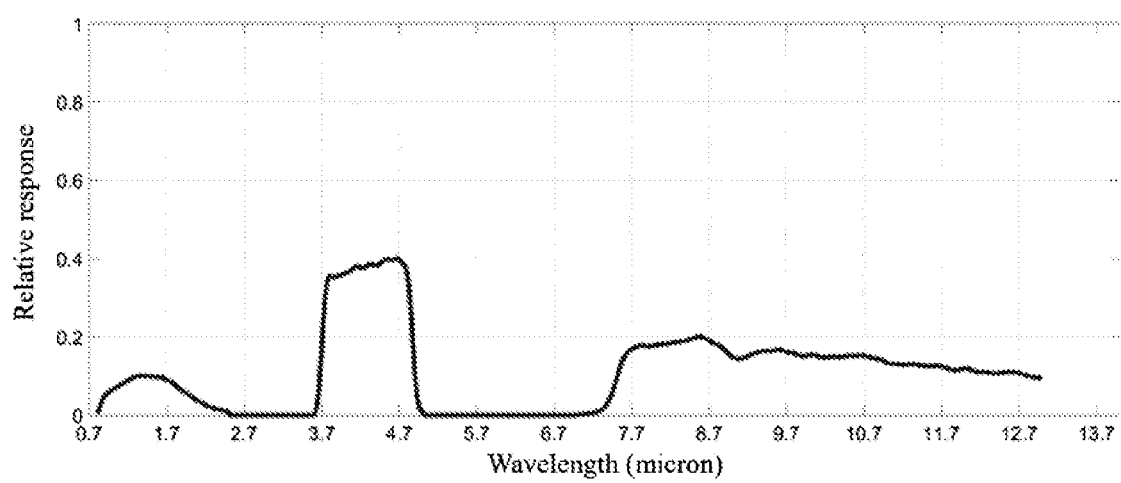
FIG. 3 is a weighted spectrum response curve of typical short-wave, medium-wave and long-wave infrared detectors according to an embodiment of the present invention.
Figure 4:
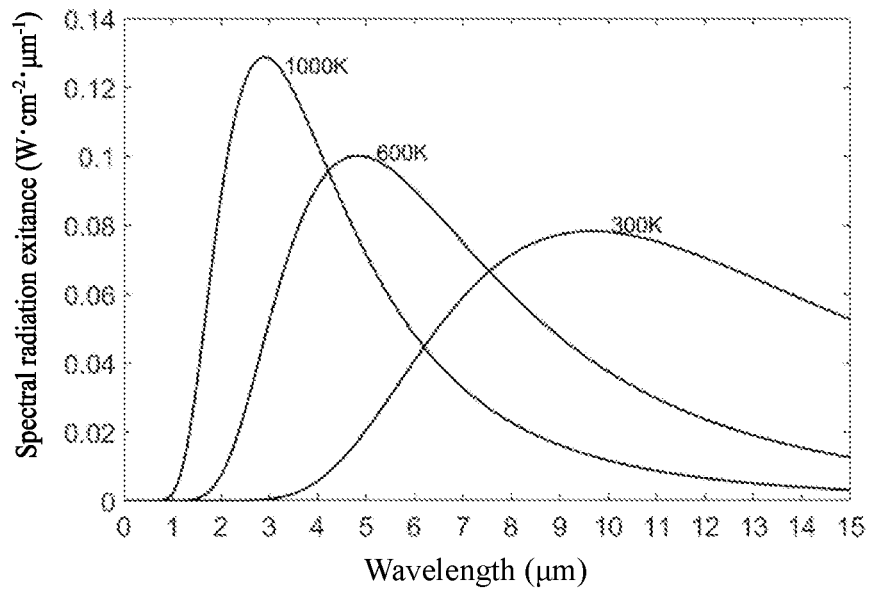
FIG. 4 shows Planck curves of a black body at high temperature, medium temperature, and normal temperature according to an embodiment of the present invention.
Figure 5:
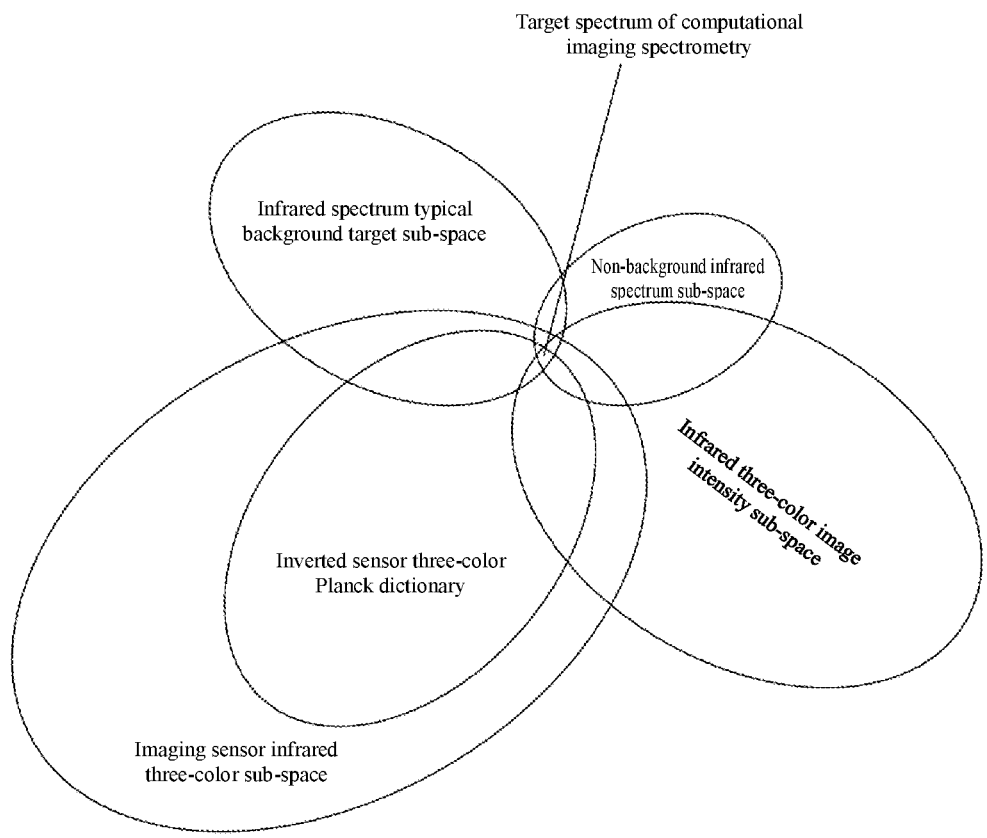
FIG. 5 is an infrared three-band spectrum dictionary organization structure according to an embodiment of the present invention.
Figure 6:
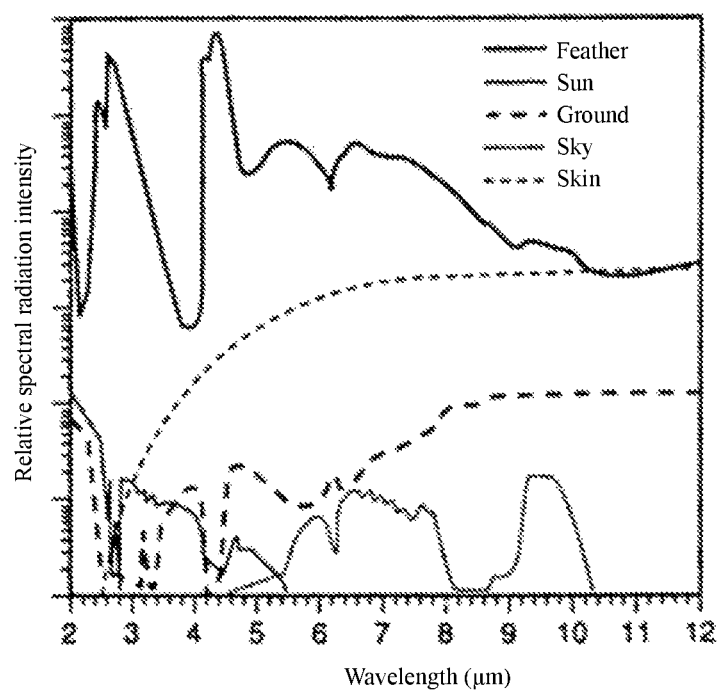
FIG. 6 is a schematic combination diagram of aircraft and background spectra according to an embodiment of the invention.
Figure 7:
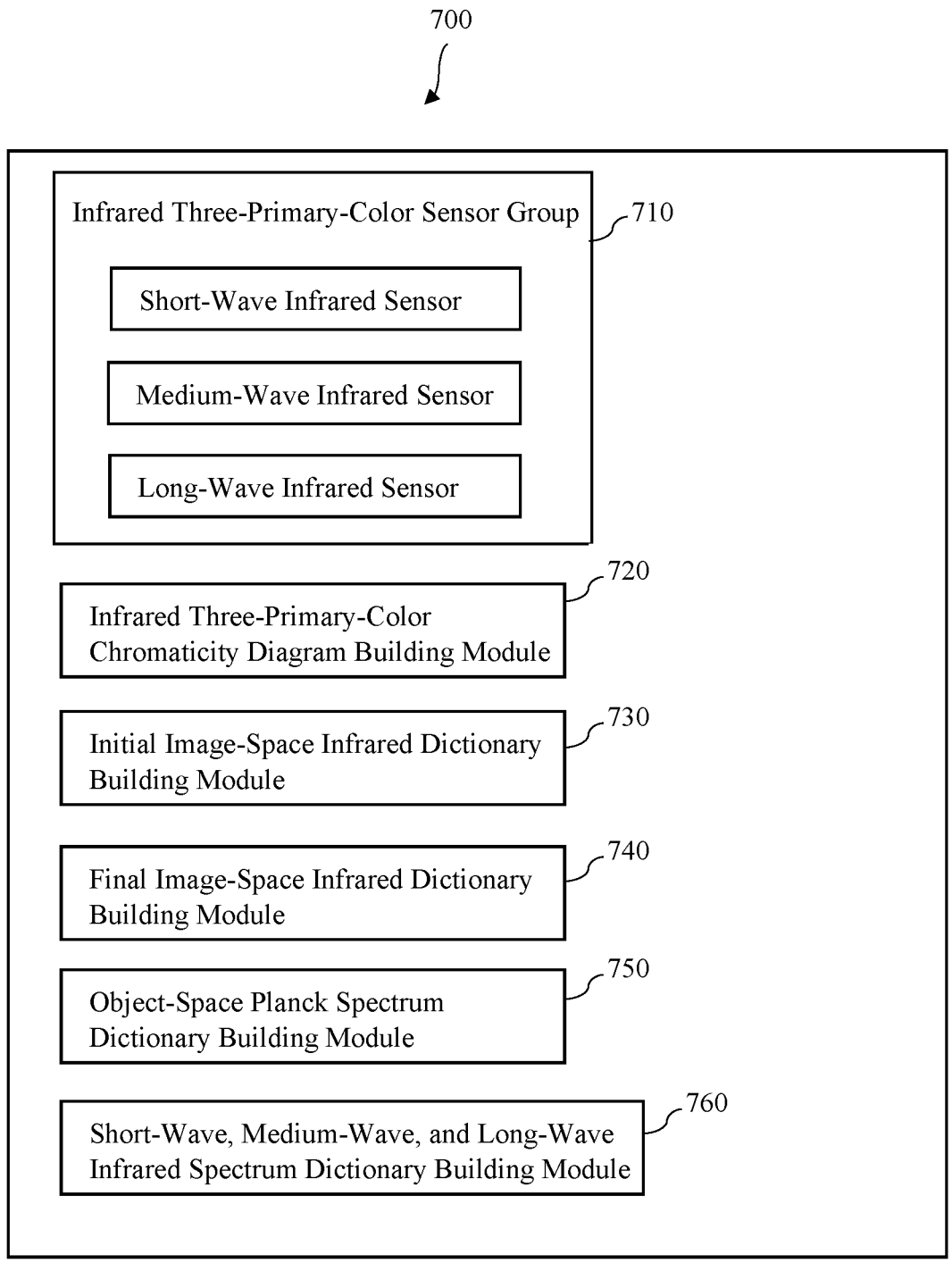
FIG. 7 is a schematic view of a system 700 for building a short-wave, medium-wave, and long-wave infrared spectrum dictionary according to an embodiment. The system 700 includes an infrared three-primary-color sensor group 710, an infrared three-primary-color chromaticity diagram building module 720, an initial image-space infrared dictionary building module 730, a final image-space infrared dictionary building module 740, an object-space Planck spectrum dictionary building module 750, and a short-wave, medium-wave, and long-wave infrared spectrum dictionary building module 760.
Figure 8:
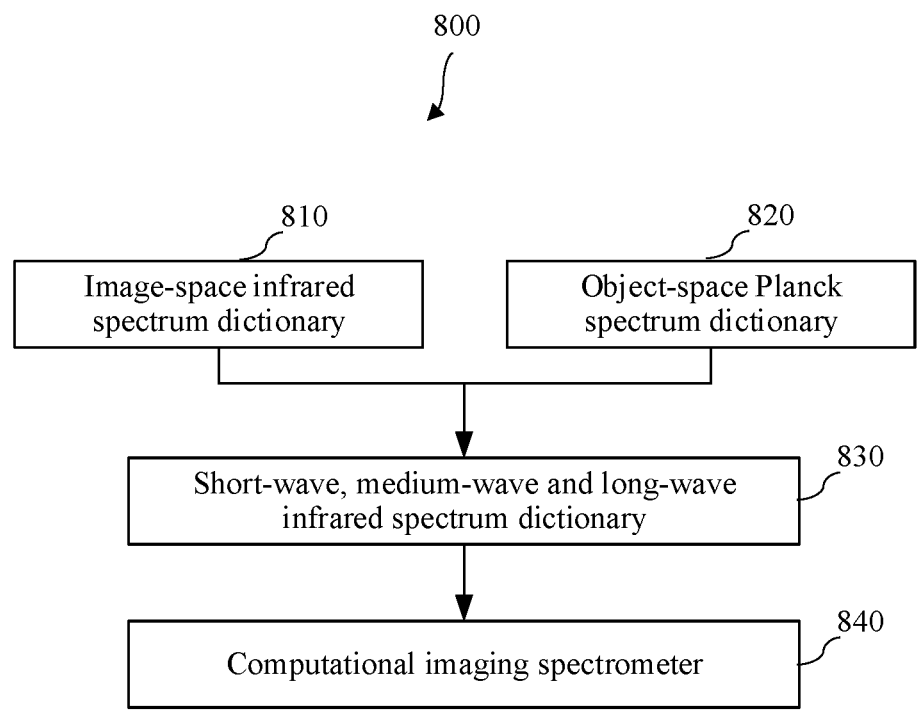
FIG. 8 is a schematic view 800 for building a short-wave, medium-wave, and long-wave infrared spectrum dictionary for a computational imaging spectrometer according to an embodiment. The short-wave, medium-wave and long-wave infrared spectrum dictionary 830 can be built by using the image-space infrared spectrum dictionary 810 and the object-space Planck spectrum dictionary 820, thereby supporting the preparation of a computational imaging spectrometer 840.

The present invention provides a method for building a short-wave, medium-wave and long-wave infrared spectrum dictionary, including the following steps:

S1: measuring to obtain infrared spectrum response curves of an infrared three-primary-color sensor group under a condition of variable input signals (that is, the input signals are changed by adjusting the illumination intensity of an incident light source, and the specific input value is determined according to a measuring instrument), more specifically:

infrared sensors (separate or integrated) with three wave bands, short-wave infrared band, medium-wave infrared band and long-wave infrared band, are defined as an infrared three-primary-color sensor group (that is, the three separate or integrated infrared sensors is taken as one unit and referred to as the infrared three-primary-color sensor group), and a spectrum response function of a sensor corresponding to each wave band in the infrared three-primary-color sensor group is measured in advance, as shown in FIG. 1;

S2: building an infrared three-primary-color chromaticity diagram by using infrared three primary colors, more specifically:

in the three-color measurement of the infrared three-primary-color sensor group, the number of the infrared three primary colors is referred to as the tristimulus values of the infrared three primary colors, and the chromaticity measurement is expressed by the proportions of the respective tristimulus values in the sum SWIR+MWIR+LWIR of the tristimulus values and is referred to as the chromaticity of an infrared band; when SWIR, MWIR and LWIR are selected as the three primary colors, swir, mwir and lwir are used to represent the chromaticity coordinates of the infrared three primary colors; and by definition, there are:

swir=SWIR/(SWIR+MWIR+LWIR);

mwir=MWIR/(SWIR+MWIR+LWIR); and lwir=LWIR/(SWIR+MWIR+LWIR), where swir+mwir+lwir=1, the infrared three primary colors at swir, mwir and lwir are used to form an infrared three-primary-color chromaticity diagram as shown in FIG. 2, and a certain coordinate point in the chromaticity diagram represents an infrared chromaticity point of an infrared color space;

S3: establishing an image-space infrared spectrum dictionary:

a spectrum type set is formed by linear and nonlinear combinations of infrared spectrum response curves of the infrared three-primary-color sensor group, and an initial image-space infrared spectrum dictionary is established; and organization is performed according to multiple scales (from coarse to precise) to facilitate query and calculation at different precision levels, and a final image-space infrared spectrum dictionary is established. S3 specifically includes the following steps:

S3.1: an image-space infrared spectrum curve is generated by using various weighted combinations of the infrared spectrum response curves of the infrared three-primary-color sensor group (the spectrum response curves of the three infrared sensors are multiplied by a weighting coefficient respectively and then are added, the range of the weighting coefficient is 0 to 1, and the increment at each time is 0.1 or 0.01);

S3.2: multi-scale discretization is performed on the infrared three-primary-color chromaticity diagram; because the chromaticity diagram contains huge color combinations, for rapid query and calculation, the infrared three-primary-color chromaticity diagram is subjected to multi-scale discretization, that is, a multi-scale (spectral resolution scale) image-space infrared spectrum dictionary is built; for example: a coarse-scale spectrum, a medium-scale spectrum and a small-scale spectrum are built, an image-space infrared spectrum dictionary is built according to a tree structure, where image-space infrared spectra of three scales are respectively located at a root node, a branch node and a leaf node of the tree; the image-space infrared spectrum of the objective world may be a specific spectrum in the image-space infrared spectrum dictionary or may be formed through weighted combination of part of image-space infrared spectrum curves in the dictionary, and the combination may be a linear weighted combination or a nonlinear weighted combination;

as shown in FIG. 3, different coefficients (with a scale of 0.1 and a range of 0 to 1) are respectively set for the short-wave, medium-wave and long-wave infrared spectrum response curves of the infrared detector and are subjected to weighted combination so as to generate a new image-space infrared spectrum curve;

all possible weights of the short wave, the medium wave and the long wave are combined to generate an image-space infrared spectrum dictionary;

more specifically, a method for building an image-space infrared spectrum dictionary includes the following steps:

a. the spectrum response curves corresponding to the three primary colors (short-wave infrared, medium-wave infrared and long-wave infrared) of the infrared three-primary-color sensor group are normalized and used as spectrum-based functions to form an infrared three-primary-color chromaticity diagram;

b. different stimulus values are generated for short-wave infrared, medium-wave infrared and long-wave infrared sensing elements of an infrared sensor through various infrared radiation energy obtained by the infrared three-primary-color sensor group to form color vision in a broad sense, and the three-primary-color spectrum response curves of the infrared three-primary-color sensor group in the step a is subjected to weighted combination to build an initial image-space infrared spectrum dictionary, wherein the combination may be linear or nonlinear;

c. points are taken on the initial infrared three-primary-color chromaticity diagram with different spectral resolutions, and the infrared three-primary-color chromaticity diagram is discretized to build a multi-scale spectral curve of the infrared sensor, forming "characters" in an image-space infrared spectrum dictionary, that is, the "characters (words)" in the image-space infrared spectrum dictionary are points after discretization of the infrared three-primary-color chromaticity diagram, wherein the scales indicate changes in the spectral resolutions;

d. chromaticity coordinates generated by discretization according to different spectral resolutions are clustered into different groups, spectrum response curves corresponding to the chromaticity coordinates of different groups are subjected to weighted combination to form "phrases" or "sentences" in the dictionary, and the "phrases" or "sentences" are added to the initial image-space infrared spectrum dictionary to generate a final image-space infrared spectrum dictionary, wherein a point on the infrared three-primary-color chromaticity diagram is the weighted sum of the image-space infrared spectrum curves corresponding to the three primary colors, and the weighted sum may be linear or nonlinear;

the "characters (words)" in the image-space infrared spectrum dictionary are points after discretization of the infrared three-color chromaticity diagram;

the "phrase" in the image-space infrared spectrum dictionary is composed of adjacent "characters (words)", may be a space line segment on the infrared three-primary-color chromaticity diagram, and may be a space curve segment on the infrared three-primary-color chromaticity diagram;

the "sentence" in the image-space infrared spectrum dictionary is formed by the weighted combination of the "words" and the "phrases";

the more detailed calculation is as follows:

the existing image-space infrared spectrum dictionary is expanded according to the infrared three-primary-color chromaticity diagram; the infrared three-primary-color chromaticity diagram is subjected to multi-scale discretization, that is, a sensor multi-scale (spectral resolution scale) image-space infrared spectrum dictionary is formed and includes spectral coordinate points and groups (expressed as a set of aggregated adjacent points, a single line segment or a plurality of line segments, a single curve segment or a plurality of curve segments on the infrared three-primary-color chromaticity diagram), wherein ① for a single point in the three-primary-color chromaticity diagram, an image-space infrared spectrum curve of the point may be obtained by performing weighted superposition calculation according to three coordinate values of short, medium and long waves; ② for a set of aggregated adjacent points in the three-primary-color chromaticity diagram, three coordinates corresponding to each of points therein are respectively added, division is performed by the number of coordinate points and the same are used as weighting coefficients to perform weighted superposition on three infrared spectrum response curves so as to build a new image-space infrared spectrum curve, and the curve represents the image-space infrared spectrum curve formed by the area point set; ③ for the spectrum response curves corresponding to the points on one line segment in the three-primary-color chromaticity diagram, three coordinate values of each of the points on the line segment are respectively added, division is performed by the number of points on the line segment, three calculation results are respectively taken as weighting coefficients of three spectrum response curves and used to perform superposition calculation to build a new image-space infrared spectrum curve, and the curve represents the image-space infrared spectrum curve of the straight line; and ④ for a combination formed by points on a curve in the three-primary-color chromaticity diagram, three coordinates of each of the points may be superposed according to position relations of the points on the curve, the superposed results are respectively divided by the number of points, the obtained results are used as weighting coefficients to perform weighted superposition on three spectrum response curves to generate a new spectrum curve, and the spectrum is the spectrum corresponding to the curve;

S4: building an object-space Planck spectrum dictionary:

Planck curves of a typical black body at high temperature (1000K), medium temperature (600K) and normal temperature (300K) are subjected to weighted combination to build an object-space Planck dictionary, wherein each spectrum curve in the dictionary represents the radiation characteristic of the black body spectrum, and is the object-space Planck spectrum of the black body. S4 specifically comprises the following:

performing weighted combination on the Planck curves of the typical black body at high temperature (1000K), medium temperature (600K) and normal temperature (300K) to generate object-space Planck spectra corresponding to targets with various combinations, and building an object-space Planck dictionary, wherein the Planck curve represents the spectral radiation exitance of the black body radiation, and the sensor acquires the radiation brightness, having the following conversion relation:

$$M = \int_{2\pi \text{ spherical degree}} L \cos\theta d\Omega$$

where M represents the radiation exitance; L represents the radiation brightness; θ represents an included angle between an observation angle and a normal line of a planar radiation source, Ω is a solid angle element expanded by the center; since the original Planck curve is expressed in the unit of radiation exitance and represents the radiation power emitted from the unit surface area of the radiation source to the hemispherical space (2π solid angle); the order of magnitude of the Planck curves at three temperatures is quite different, and based on that the target spectrum is the spectrum weighted sum of n constituent parts {$S_i$} constituting the target, that is, $$S_I = \alpha_1 S_1 + \alpha_2 S_2 + \ldots + \alpha_i S_i + \ldots + \alpha_n S_n$$

where $\alpha_i$ is the area ratio (volume) of the $i^{th}$ constituent part, and $S_i$ is the radiation spectrum of the $i^{th}$ constituent part; therefore, in order to make the Planck curves associated with high temperature, medium temperature and normal temperature have the same order of magnitude, the Planck curves are respectively multiplied by different areas to serve as the elements of the object-space Planck spectrum dictionary for weighted combination, that is, $$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

where Planck_curve$_H$ represents a high-temperature Planck curve element; Planck_curve$_M$ represents a medium-temperature Planck curve element; Planck_curve$_L$ represents a low-temperature Planck curve element; $\alpha_h$, $\alpha_m$ and $\alpha_L$ respectively represent area coefficients multiplied by the Planck curves associated with three temperatures, so that the high-temperature object-space Planck spectrum curve, the medium-temperature object-space Planck spectrum curve and the low-temperature object-space Planck spectrum curve have the same order of magnitude; $c_1$ represents a first radiation constant; $c_2$ represents a second radiation constant; and λ is the wavelength of the object-space Planck spectrum, and T is an absolute temperature in units of K; as shown in FIG. 4 which shows the Planck curves of the black body at three temperatures after correction, the high-temperature part usually has a smaller volume/area ratio, so a smaller area weighting coefficient can be used; the high-temperature, medium-temperature and low-temperature Planck curves are subjected to weighted combination to form an object-space Planck spectrum dictionary;

S5: using image-space infrared spectra of a typical target and a typical background to expand a final image-space infrared spectrum dictionary:

near-infrared, short-wave, medium-wave and long-wave infrared spectrum characteristics of a typical space background, an earth background and a earth-limb background are investigated and analyzed, and an image-space infrared spectrum dictionary of a corresponding background is established; the spectrum response characteristics of an aerial target is investigated, and an image-space infrared spectrum dictionary of the target is established, wherein the spectrum dictionary is organized as shown in FIG. 5;

S5.1: establishing an image-space infrared spectrum of the typical target:

an unknown target in a natural scenario has unique non-homogenous and non-homothermal spectral features; the object-space Planck spectrum of the target reflects the entire optical wave band, and the atmospheric transmittance changes under different conditions, such that a difference is present in the measured image-space infrared spectrum; due to different temperatures and emissivities of different parts of the target, the target can reflect the characteristics in a wide spectral band range;

for example, the radiation sources for spectral features of an aircraft mainly include: reflected solar radiation, reflected earth radiation, engine air intake component radiation, pneumatically heated skin radiation, engine hot component radiation, plume radiation, the spectral radiation of the aircraft and the background spectral features of the aircraft;

S5.2: establishing an image-space infrared spectrum of the typical background:

FIG. 6 is a typical sky background infrared image and spectrum which are respectively captured by a short-wave infrared camera, a medium-wave infrared camera, and a long-wave infrared camera; for ground targets without internal heat sources, such as bridges, airport runways and reservoir dams, the temperature of the ground targets may be higher or lower than that of the surrounding background; for urban buildings, under a condition of no sudden weather change, the surface temperature changes periodically between day and night; and S5.3: adding the image-space infrared spectrum of the typical background and the image-space infrared spectrum of the typical target to a short-wave, medium-wave and long-wave infrared spectrum dictionary to complete building of the short-wave, medium-wave and long-wave infrared spectrum dictionary.

The application of the short-wave, medium-wave and long-wave infrared spectrum dictionary in an actual scenario is described as follows:

U1: iterative query of a spectrum dictionary:

the image-space infrared spectrum obtained from actual measurement is compared with the image-space infrared spectrum dictionary, and the image-space infrared spectrum dictionary is iteratively queried for an entry with the minimum deviation from the image-space infrared spectrum obtained from actual measurement;

U2: a target/background identification method associated with graphs:

the method for identifying the target/background by using the image-space infrared spectrum dictionary includes the following steps:

spectral feature analysis:

U2a.1: spectral feature processing, including spectrum decomposition (specific feature spectral line separation), spectrum classification, and spectrum ordering;

U2a.2: spectral feature storage: spectral features are classified and stored, and a quick retrieval and extraction function is achieved; and U2a.3: spectral feature comparison: feature matching is performed on the basis of the stored known target spectrum to obtain identification information.

Spectrum identification modes:

U2b.1: a passive spectral identification mode: spectral features generated from emission performed by a target and reflection of solar/environmental illumination are detected, for example, identification of infrared spectral features of engine plume of different aircrafts at different operating periods, identification of target radiation spectral features and identification of reflection spectral features;

U2b.2: a spectrum band identification mode: the identification mode for identification of overall distribution and extreme value features of the entire target spectrum is particularly suitable for identifying and recognizing the target for the first time, and has the characteristics of high identification speed, high identification rate and excellent single spectral interference resistance;

U2b.3: an identification mode for the spectrum fine structure: for a specific spectrum band of a target spectrum, the identification mode for identification of fine structure features of a spectrum is particularly suitable for tracking and confirming the target, has the characteristics of high identification precision and excellent multispectral interference resistance, and is generally integrated and combined with a spectrum band identification method to maximally prevent interference.

A target-characteristic-oriented spectrum analysis method:

for analysis of spectral data, the spectral data is filtered and denoised, and then is processed as follows:

D1: objects are categorized into four categories: low-temperature/normal-temperature objects, medium-temperature objects, high-temperature objects, and low-temperature/normal-temperature/medium-temperature/high-temperature mixed objects; low-temperature/normal-temperature objects: such as vehicles, stationary aircrafts, parked ships, ground/sea and sky backgrounds; medium-temperature objects: engine nozzles and plume of take-off and landing aircrafts, and missiles in a moving state; high-temperature objects: launched missiles/rockets, explosions, decoys, the sun, fires, and high-pressure sodium lamps;

D2: spectral distribution characteristics of various objects; for the spectrum of a low-temperature/normal-temperature object: radiation is mainly concentrated in the long-wave band, the radiation energy of the radiation in a medium-wave band is weak relative to the radiation energy in the long-wave band, and a medium-wave reflection spectrum is present under the condition of environmental illumination, such as solar illumination; for a medium-temperature object: the peak value is present in the short-wave band and the medium-wave band of the engine and plume, and the radiation is present in the long-wave band; for a high-temperature object: the radiation energy is stronger mainly in the short-wave band; and D3: the objects with different temperatures are identified by using the spectra in the different wave bands, and different objects are distinguished in multiple dimensions such as multiple scales, frequency domains, spatial domains and temporal domains.

Compared with the prior art, the present invention has the following advantages:

according to the method and system for building a short-wave, medium-wave and long-wave infrared spectrum dictionary provided by the present invention, on the one hand, infrared spectrum response curves of an infrared three-primary-color sensor group are normalized and used as spectrum-based functions to form an infrared three-primary-color chromaticity diagram. The image-space infrared spectrum dictionary is built in two steps: 1. performing weighted combination on infrared spectrum response curves to build an initial image-space infrared spectrum dictionary; and 2. performing multi-scale discretization on the infrared three-primary-color chromaticity diagram, clustering the chromaticity coordinates generated by discretization into different groups and points, performing weighted combination on the infrared spectrum response curves corresponding to the chromaticity coordinates of the groups and points, generating a new image-space infrared spectrum, adding the new image-space infrared spectrum to the initial image-space infrared spectrum dictionary, and generating a final image-space infrared spectrum dictionary. The image-space infrared spectrum dictionary completed in two steps comprises a large amount of various infrared spectra. On the other hand, according to the present invention, object-space Planck curves associated with three different temperatures are subjected to weighted combination to build an object-space Planck spectrum dictionary. The image-space infrared spectrum dictionary and the object-space Planck spectrum dictionary are used to build the short-wave, medium-wave and long-wave infrared spectrum dictionary, thereby supporting a novel computational imaging spectrometer.

The method for building the short-wave, medium-wave and long-wave infrared spectrum dictionary provided by the present invention employs the concept different from the current concept in the computational imaging spectrometry field. The method performs normalization on infrared spectrum response curves obtained by short-wave, medium-wave and long-wave infrared three-primary-color sensors to form an infrared three-primary-color chromaticity diagram so as to build an image infrared spectrum dictionary, fully considers spectrum sensing characteristics of the sensor body, has better adaptability to the scenario requiring real-time computational spectrometry imaging, is applicable to the real-time acquisition of spectra of remote moving targets and dynamic phenomena, and has better popularization significance for general computational spectrometry imaging.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A method for building a short-wave, medium-wave and long-wave infrared spectrum dictionary for preparation of a computational imaging spectrometer, the method comprising the following steps:
S1: measuring to obtain infrared spectrum response curves of an infrared three-primary-color sensor group under a condition of variable input signals, wherein the infrared three-primary-color sensor group comprises: a short-wave infrared sensor, a medium-wave infrared sensor and a long-wave infrared sensor;
S2: performing normalization on the infrared spectrum response curves of the infrared three-primary-color sensor group, using same as spectrum-based functions, and taking the proportions of the sum of tristimulus values accounted for by the tristimulus values corresponding to an infrared imaging sensor group as chromaticity of an infrared band to form an infrared three-primary-color chromaticity diagram;
S3: performing weighted combination on the infrared spectrum response curves to build an initial image-space infrared spectrum dictionary;
S4: performing multi-scale discretization on the infrared three-primary-color chromaticity diagram, clustering chromaticity coordinates generated by discretization into different groups, performing weighted combination on the infrared spectrum response curves corresponding to the chromaticity coordinates of each point in the groups, generating a new image-space infrared spectrum, adding the new image-space infrared spectrum to the initial image-space infrared spectrum dictionary, and generating a final image-space infrared spectrum dictionary;
S5: performing weighted combination on object-space Planck curves associated with three different temperatures to build an object-space Planck spectrum dictionary, wherein the object-space Planck curves associated with three different temperatures are respectively a high-temperature object-space Planck curve, a medium-temperature object-space Planck curve and a low-temperature object-space Planck curve according to the temperatures;
S6: using the final image-space infrared spectrum dictionary and the object-space Planck spectrum dictionary to build a short-wave, medium-wave and long-wave infrared spectrum dictionary; and
preparing the computational imaging spectrometer with the short-wave, medium-wave, and long-wave infrared spectrum dictionary.

2. The building method according to claim 1, further comprising the following steps between S5 and S6:
selecting a preset real target and a preset background, and acquiring an image-space infrared spectrum of the real target and the background by using the infrared three-primary-color sensor group; and
adding the image-space infrared spectrum of the real target and the background to the final image-space infrared spectrum dictionary.

3. The building method according to claim 1, wherein S4 specifically comprises the following steps:
taking points on the infrared three-primary-color chromaticity diagram with different spectral resolutions, and performing discretization on the infrared three-primary-color chromaticity diagram to build a multi-scale spectrum curve of the infrared three-primary-color sensor group, wherein the scales indicate changes in the spectral resolutions;
clustering chromaticity coordinates generated by discretization according to different spectral resolutions into different groups;
for a single point on the infrared three-primary-color chromaticity diagram, performing weighted superposition according to three coordinate values of medium-wave infrared, long-wave infrared and short-wave infrared to calculate an image-space infrared spectrum curve corresponding to the single point on the infrared three-primary-color chromaticity diagram;
for a set of aggregated adjacent points on the infrared three-primary-color chromaticity diagram, respectively adding three coordinate values of medium-wave infrared, long-wave infrared and short-wave infrared corresponding to each of the points, performing division by the number of coordinate points, and using same as weighting coefficients to perform weighted addition on infrared spectrum response curves corresponding to each wave band to build a new image-space infrared spectrum curve;
for a line segment on the infrared three-primary-color chromaticity diagram, respectively adding three coordinate values of medium-wave infrared, long-wave infrared and short-wave infrared corresponding to each of points on the line segment, performing division by the number of points on the line segment, respectively taking calculation results of the three coordinate values as weighting coefficients of infrared spectrum response curves of the corresponding wave band for superposition calculation, and building a new image-space infrared spectrum curve;
for a curve on the infrared three-primary-color chromaticity diagram, adding three coordinate values of medium-wave infrared, long-wave infrared and short-wave infrared corresponding to each of points according to position relations of the points on the curve, performing division by the number of points on line segments, respectively taking calculation results of the three coordinate values as weighting coefficients of infrared spectrum response curves of the corresponding wave band for superposition calculation, and building a new image-space infrared spectrum curve; and
adding all of the new image-space infrared spectrum curves to the initial image-space infrared spectrum dictionary to generate a final image-space infrared spectrum dictionary.

4. The building method according to claim 1, wherein elements of the object-space Planck spectrum dictionary are expressed as follows:

$$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

wherein $\text{Planck\_Curve}_H$ represents a high-temperature Planck curve element; $\text{Planck\_Curve}_M$ represents a medium-temperature Planck curve element; $\text{Planck\_Curve}_L$ represents a low-temperature Planck curve element; α represents area coefficients multiplied by the object-space Planck curves associated with three temperatures, so that the high-temperature object-space Planck spectrum curve, the medium-temperature object-space Planck spectrum curve and the low-temperature object-space Planck spectrum curve have the same order of magnitude; $c_1$ represents a first radiation constant; $c_2$ represents a second radiation constant; and λ is the wavelength of the object-space Planck spectrum, and T is an absolute temperature in units of K.

5. The building method according to claim 3, wherein coordinates of the infrared three-primary-color chromaticity diagram are:

swir=SWIR/(SWIR+MWIR+LWIR);

mwir=MWIR/(SWIR+MWIR+LWIR); and lwir=LWIR/(SWIR+MWIR+LWIR), wherein swir+mwir+lwir=1, and SWIR, MWIR, and LWIR are respectively stimulus values corresponding to short-wave infrared, medium-wave infrared and long-wave infrared.

6. A system for building a short-wave, medium-wave and long-wave infrared spectrum dictionary for preparation of a computational imaging spectrometer, the system comprising:
an infrared three-primary-color sensor group, configured to measure to obtain infrared spectrum response curves under a condition of variable input signals, wherein the infrared three-primary-color sensor group comprises: a short-wave infrared sensor, a medium-wave infrared sensor and a long-wave infrared sensor;
an infrared three-primary-color chromaticity diagram building module, configured to perform normalization on the infrared spectrum response curves of the infrared three-primary-color sensor group, use same as spectrum-based functions, and take the proportions of the sum of tristimulus values accounted for by the tristimulus values corresponding to an infrared imaging sensor group as chromaticity of an infrared band to form an infrared three-primary-color chromaticity diagram;
an initial image-space infrared dictionary building module, configured to perform weighted combination on the infrared spectrum response curves to build an initial image-space infrared spectrum dictionary;
a final image-space infrared dictionary building module, configured to perform multi-scale discretization on the infrared three-primary-color chromaticity diagram, cluster chromaticity coordinates generated by discretization into different groups, perform weighted combination on infrared spectrum response curves corresponding to the chromaticity coordinates of each point in the groups, generate a new image-space infrared spectrum, add the new image-space infrared spectrum to the initial image-space infrared spectrum dictionary, and generate a final image-space infrared spectrum dictionary;
an object-space Planck spectrum dictionary building module, configured to perform weighted combination on object-space Planck curves associated with three different temperatures to build an object-space Planck spectrum dictionary, wherein the object-space Planck curves associated with three different temperatures are respectively a high-temperature object-space Planck curve, a medium-temperature object-space Planck curve and a low-temperature object-space Planck curve according to the temperatures; and
a short-wave, medium-wave and long-wave infrared spectrum dictionary building module, configured to build a short-wave, medium-wave and long-wave infrared spectrum dictionary by using the final image-space infrared spectrum dictionary and the object-space Planck spectrum dictionary,
wherein the computational imaging spectrometer is prepared with the short-wave, medium-wave and long-wave infrared spectrum dictionary.

7. The building system according to claim 6, wherein the infrared three-primary-color sensor group is further configured to select a preset real target and a preset background and acquire an image-space infrared spectrum of the real target and the background; and
a spectrum processing module is configured to add the image-space infrared spectrum of the real target and the background to the final image-space infrared spectrum dictionary.

8. The building system according to claim 6, wherein the final image-space infrared dictionary building module comprises:
a chromaticity diagram discretization unit, configured to take points on the infrared three-primary-color chromaticity diagram with different spectral resolutions, and perform discretization on the infrared three-primary-color chromaticity diagram to build a multi-scale spectrum curve of the infrared three-primary-color sensor group, wherein the scales indicate changes in the spectral resolutions;
a coordinate clustering unit, configured to cluster chromaticity coordinates generated by discretization according to different spectral resolutions into different groups;
a unit for building a single-point image-space infrared spectrum curve, configured to perform weighted superposition according to three coordinate values of medium-wave infrared, long-wave infrared and short-wave infrared for a single point on the infrared three-primary-color chromaticity diagram, and calculate an image-space infrared spectrum curve corresponding to the single point on the infrared three-primary-color chromaticity diagram;
a unit for building a point-set image-space infrared spectrum curve, configured to respectively add three coordinate values of medium-wave infrared, long-wave infrared and short-wave infrared corresponding to each of points in a set of aggregated adjacent points on the infrared three-primary-color chromaticity diagram, perform division by the number of coordinate points, use same as weighting coefficients to perform weighted addition on infrared spectrum response curves corresponding to each wave band to build a new image-space infrared spectrum curve;
a unit for building a line-segment image-space infrared spectrum curve, configured to: for a line segment on the infrared three-primary-color chromaticity diagram, respectively add three coordinate values of medium-wave infrared, long-wave infrared and short-wave infrared corresponding to each of points on the line segment, perform division by the number of points on the line segment, respectively take calculation results of the three coordinate values as weighting coefficients of infrared spectrum response curves of the corresponding wave band for superposition calculation, and build a new image-square infrared spectrum curve;

a unit for building a curve image-space infrared spectrum curve, configured to: for a curve on the infrared three-primary-color chromaticity diagram, respectively add three coordinate values of medium-wave infrared, long-wave infrared and short-wave infrared corresponding to each of points according to position relations of the points on the curve, perform division by the number of points on line segments, respectively take calculation results of the three coordinate values as weighting coefficients of infrared spectrum response curves of the corresponding wave band for superposition calculation, and build a new image-space infrared spectrum curve; and a unit for building a final image-space infrared spectrum dictionary, configured to add all of the new image-space infrared spectrum curves to the initial image-space infrared spectrum dictionary to generate a final image-space infrared spectrum dictionary.

9. The building system according to claim 6, wherein elements of the object-space Planck spectrum dictionary are expressed as follows:

$$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

wherein $\text{Planck\_curve}_H$ represents a high-temperature Planck curve element; $\text{Planck\_curve}_M$ represents a medium-temperature Planck curve element; $\text{Planck\_curve}_L$ represents a low-temperature Planck curve element; $\alpha_h$, $\alpha_m$ and $\alpha_L$ respectively represent area coefficients multiplied by the high-temperature object-space Planck spectrum curve, the medium-temperature object-space Planck spectrum curve and the low-temperature object-space Planck spectrum curve; $c_1$ represents a first radiation constant; $c_2$ represents a second radiation constant; and $\lambda$ is the wavelength of the object-space Planck spectrum, and T is an absolute temperature in units of K.

10. The building system according to claim 8, wherein coordinates of the infrared three-primary-color chromaticity diagram are:

swir=SWIR/(SWIR+MWIR+LWIR);

mwir=MWIR/(SWIR+MWIR+LWIR); and lwir=LWIR/(SWIR+MWIR+LWIR), wherein swir+mwir+lwir=1, and SWIR, MWIR, and LWIR are respectively stimulus values corresponding to short-wave infrared, medium-wave infrared and long-wave infrared.

11. A method for building a short-wave, medium-wave and long-wave infrared spectrum dictionary, the method comprising:

obtaining infrared spectrum response curves of an infrared three-primary-color sensor group under a condition of variable input signals, wherein the infrared three-primary-color sensor group comprises: a short-wave infrared sensor, a medium-wave infrared sensor, and a long-wave infrared sensor;

performing normalization on the infrared spectrum response curves of an infrared three-primary-color sensor group, using same as spectrum-based functions, and taking the proportions of the sum of tristimulus values accounted for by the tristimulus values corresponding to an infrared imaging sensor group as chromaticity of an infrared band to form an infrared three-primary-color chromaticity diagram;

performing weighted combination on the infrared spectrum response curves to build an initial image-space infrared spectrum dictionary;

performing multi-scale discretization on the infrared three-primary-color chromaticity diagram, clustering chromaticity coordinates generated by discretization into different groups, performing weighted combination on the infrared spectrum response curves corresponding to the chromaticity coordinates of each point in the groups, generating a new image-space infrared spectrum, adding the new image-space infrared spectrum to the initial image-space infrared spectrum dictionary, and generating a final image-space infrared spectrum dictionary;

performing weighted combination on object-space Planck curves associated with three different temperatures to build an object-space Planck spectrum dictionary, wherein the object-space Planck curves associated with three different temperatures are respectively a high-temperature object-space Planck curve, a medium-temperature object-space Planck curve and a low-temperature object-space Planck curve according to the temperatures; and building a short-wave, medium-wave and long-wave infrared spectrum dictionary using the final image-space infrared spectrum dictionary and the object-space Planck spectrum dictionary.

12. The building method according to claim 11, further comprising the following steps between the performing of the weighted combination on the object-space Planck curves and the building of the short-wave, medium-wave and long-wave infrared spectrum dictionary:

selecting a preset real target and a preset background, and acquiring an image-space infrared spectrum of the real target and the background by using the infrared three-primary-color sensor group; and adding the image-space infrared spectrum of the real target and the background to the final image-space infrared spectrum dictionary.

13. The building method according to claim 11, wherein the performing of the multi-scale discretization, the clustering of the chromaticity coordinates, the performing of the weighted combination, the generating of the new image-space infrared spectrum, the adding of the new image-space infrared spectrum, and the generating of the final image-space infrared spectrum dictionary comprise the following steps:

taking points on the infrared three-primary-color chromaticity diagram with different spectral resolutions, and performing discretization on the infrared three-primary-color chromaticity diagram to build a multi-scale spectrum curve of the infrared three-primary-color sensor group, wherein the scales indicate changes in the spectral resolutions;

clustering chromaticity coordinates generated by discretization according to different spectral resolutions into different groups;

for a single point on the infrared three-primary-color chromaticity diagram, performing weighted superposition according to three coordinate values of medium-wave infrared, long-wave infrared and short-wave infrared to calculate an image-space infrared spectrum curve corresponding to the single point on the infrared three-primary-color chromaticity diagram;

for a set of aggregated adjacent points on the infrared three-primary-color chromaticity diagram, respectively adding three coordinate values of medium-wave infrared, long-wave infrared and short-wave infrared corresponding to each of the points, performing division by the number of coordinate points, and using same as weighting coefficients to perform weighted addition on infrared spectrum response curves corresponding to each wave band to build a new image-space infrared spectrum curve;

for a line segment on the infrared three-primary-color chromaticity diagram, respectively adding three coordinate values of medium-wave infrared, long-wave infrared and short-wave infrared corresponding to each of points on the line segment, performing division by the number of points on the line segment, respectively taking calculation results of the three coordinate values as weighting coefficients of infrared spectrum response curves of the corresponding wave band for superposition calculation, and building a new image-space infrared spectrum curve;

for a curve on the infrared three-primary-color chromaticity diagram, adding three coordinate values of medium-wave infrared, long-wave infrared and short-wave infrared corresponding to each of points according to position relations of the points on the curve, performing division by the number of points on line segments, respectively taking calculation results of the three coordinate values as weighting coefficients of infrared spectrum response curves of the corresponding wave band for superposition calculation, and building a new image-space infrared spectrum curve; and adding all of the new image-space infrared spectrum curves to the initial image-space infrared spectrum dictionary to generate a final image-space infrared spectrum dictionary.

14. The building method according to claim 11, wherein elements of the object-space Planck spectrum dictionary are expressed as follows:

$$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

wherein Planck_Curve$_H$ represents a high-temperature Planck curve element; Planck_Curve$_M$ represents a medium-temperature Planck curve element; Planck_Curve$_L$ represents a low-temperature Planck curve element; $\alpha$ represents area coefficients multiplied by the object-space Planck curves associated with three temperatures, so that the high-temperature object-space Planck spectrum curve, the medium-temperature object-space Planck spectrum curve and the low-temperature object-space Planck spectrum curve have the same order of magnitude; $c_1$ represents a first radiation constant; $c_2$ represents a second radiation constant; and $\lambda$ is the wavelength of the object-space Planck spectrum, and T is an absolute temperature in units of K.

15. The building method according to claim 13, wherein coordinates of the infrared three-primary-color chromaticity diagram are:

swir=SWIR/(SWIR+MWIR+LWIR);

mwir=MWIR/(SWIR+MWIR+LWIR); and lwir=LWIR/(SWIR+MWIR+LWIR), wherein swir+mwir+lwir=1, and SWIR, MWIR, and LWIR are respectively stimulus values corresponding to short-wave infrared, medium-wave infrared and long-wave infrared.

16. A system for building a short-wave, medium-wave and long-wave infrared spectrum dictionary, comprising:

an infrared three-primary-color sensor group, configured to measure to obtain infrared spectrum response curves under a condition of variable input signals, wherein the infrared three-primary-color sensor group comprises: a short-wave infrared sensor, a medium-wave infrared sensor and a long-wave infrared sensor;

an infrared three-primary-color chromaticity diagram building module, configured to perform normalization on the infrared spectrum response curves of the infrared three-primary-color sensor group, use same as spectrum-based functions, and take the proportions of the sum of tristimulus values accounted for by the tristimulus values corresponding to an infrared imaging sensor group as chromaticity of an infrared band to form an infrared three-primary-color chromaticity diagram;

an initial image-space infrared dictionary building module, configured to perform weighted combination on the infrared spectrum response curves to build an initial image-space infrared spectrum dictionary;

a final image-space infrared dictionary building module, configured to perform multi-scale discretization on the infrared three-primary-color chromaticity diagram, cluster chromaticity coordinates generated by discretization into different groups, perform weighted combination on infrared spectrum response curves corresponding to the chromaticity coordinates of each point in the groups, generate a new image-space infrared spectrum, add the new image-space infrared spectrum to the initial image-space infrared spectrum dictionary, and generate a final image-space infrared spectrum dictionary;

an object-space Planck spectrum dictionary building module, configured to perform weighted combination on object-space Planck curves associated with three different temperatures to build an object-space Planck spectrum dictionary, wherein the object-space Planck curves associated with three different temperatures are respectively a high-temperature object-space Planck curve, a medium-temperature object-space Planck curve and a low-temperature object-space Planck curve according to the temperatures; and a short-wave, medium-wave and long-wave infrared spectrum dictionary building module, configured to build a short-wave, medium-wave and a long-wave infrared spectrum dictionary by using the final image-space infrared spectrum dictionary and the object-space Planck spectrum dictionary.

17. The building system according to claim 16, wherein the infrared three-primary-color sensor group is further configured to select a preset real target and a preset background and acquire an image-space infrared spectrum of the real target and the background; and a spectrum processing module is configured to add the image-space infrared spectrum of the real target and the background to the final image-space infrared spectrum dictionary.

18. The building system according to claim 16, wherein the final image-space infrared dictionary building module comprises:

a chromaticity diagram discretization unit, configured to take points on the infrared three-primary-color chromaticity diagram with different spectral resolutions, and perform discretization on the infrared three-primary-color chromaticity diagram to build a multi-scale spectrum curve of the infrared three-primary-color sensor group, wherein the scales indicate changes in the spectral resolutions;

a coordinate clustering unit, configured to cluster chromaticity coordinates generated by discretization according to different spectral resolutions into different groups;

a unit for building a single-point image-space infrared spectrum curve, configured to perform weighted superposition according to three coordinate values of medium-wave infrared, long-wave infrared and short-wave infrared for a single point on the infrared three-primary-color chromaticity diagram, and calculate an image-space infrared spectrum curve corresponding to the single point on the infrared three-primary-color chromaticity diagram;

a unit for building a point-set image-space infrared spectrum curve, configured to respectively add three coordinate values of medium-wave infrared, long-wave infrared and short-wave infrared corresponding to each of points in a set of aggregated adjacent points on the infrared three-primary-color chromaticity diagram, perform division by the number of coordinate points, use same as weighting coefficients to perform weighted addition on infrared spectrum response curves corresponding to each wave band to build a new image-space infrared spectrum curve;

a unit for building a line-segment image-space infrared spectrum curve, configured to: for a line segment on the infrared three-primary-color chromaticity diagram, respectively add three coordinate values of medium-wave infrared, long-wave infrared and short-wave infrared corresponding to each of points on the line segment, perform division by the number of points on the line segment, respectively take calculation results of the three coordinate values as weighting coefficients of infrared spectrum response curves of the corresponding wave band for superposition calculation, and build a new image-square infrared spectrum curve;

a unit for building a curve image-space infrared spectrum curve, configured to: for a curve on the infrared three-primary-color chromaticity diagram, respectively add three coordinate values of medium-wave infrared, long-wave infrared and short-wave infrared corresponding to each of points according to position relations of the points on the curve, perform division by the number of points on line segments, respectively take calculation results of the three coordinate values as weighting coefficients of infrared spectrum response curves of the corresponding wave band for superposition calculation, and build a new image-space infrared spectrum curve; and a unit for building a final image-space infrared spectrum dictionary, configured to add all of the new image-space infrared spectrum curves to the initial image-space infrared spectrum dictionary to generate a final image-space infrared spectrum dictionary.

19. The building system according to claim 16, wherein elements of the object-space Planck spectrum dictionary are expressed as follows:

$$\text{Planck\_curve}_H = \alpha_h \cdot \frac{c_1}{\lambda^5} \cdot \frac{1}{e^{c_2/\lambda T} - 1}$$

$$\text{Planck\_curve}_M = \alpha_m \cdot \frac{c_1}{\lambda^5} \cdot \frac{1}{e^{c_2/\lambda T} - 1}$$

$$\text{Planck\_curve}_L = \alpha_l \cdot \frac{c_1}{\lambda^5} \cdot \frac{1}{e^{c_2/\lambda T} - 1}$$

wherein $\text{Planck\_curve}_H$ represents a high-temperature Planck curve element; $\text{Planck\_curve}_M$ represents a medium-temperature Planck curve element; $\text{Planck\_curve}_L$ represents a low-temperature Planck curve element; $\alpha_h$, $\alpha_m$ and $\alpha_L$ respectively represent area coefficients multiplied by the high-temperature object-space Planck spectrum curve, the medium-temperature object-space Planck spectrum curve and the low-temperature object-space Planck spectrum curve; $c_1$ represents a first radiation constant; $c_2$ represents a second radiation constant; and $\lambda$ is the wavelength of the object-space Planck spectrum, and T is an absolute temperature in units of K.

20. The building system according to claim 18, wherein coordinates of the infrared three-primary-color chromaticity diagram are:

swir=SWIR/(SWIR+MWIR+LWIR);

mwir=MWIR/(SWIR+MWIR+LWIR); and lwir=LWIR/(SWIR+MWIR+LWIR), wherein swir+mwir+lwir=1, and SWIR, MWIR, and LWIR are respectively stimulus values corresponding to short-wave infrared, medium-wave infrared and long-wave infrared.

* * * * *